(12) United States Patent
Keong

(10) Patent No.: US 10,259,531 B2
(45) Date of Patent: Apr. 16, 2019

(54) BICYCLE FRONT DERAILLEUR

(71) Applicant: SHIMANO (SINGAPORE) PTE.. LTD., Jurong Town (SG)

(72) Inventor: Shir Ting Keong, Jurong Town (SG)

(73) Assignee: SHIMANO (SINGAPORE) PTE. LTD., Jurong Town (SG)

( * ) Notice: Subject to any disclaimer, the term of this patent is extended or adjusted under 35 U.S.C. 154(b) by 189 days.

(21) Appl. No.: 15/391,784

(22) Filed: Dec. 27, 2016

(65) Prior Publication Data

US 2017/0225741 A1 Aug. 10, 2017

(30) Foreign Application Priority Data

Feb. 5, 2016 (CN) .......................... 2016 1 00829803

(51) Int. Cl.
B62M 9/135 (2010.01)

(52) U.S. Cl.
CPC .................................. B62M 9/135 (2013.01)

(58) Field of Classification Search
CPC .... B62M 9/135; B62M 9/1344; B62M 9/132; B62M 9/1342; B62M 9/136
USPC ...................................................... 474/80, 82
See application file for complete search history.

(56) References Cited

U.S. PATENT DOCUMENTS

| 2,590,975 | A | * | 4/1952 | Juy | ........................ | B62M 9/134 |
| | | | | | | 474/80 |
| 4,199,997 | A | * | 4/1980 | Isobe | ................... | B62M 9/1344 |
| | | | | | | 280/236 |
| 4,424,048 | A | * | 1/1984 | Shimano | ................ | B62M 9/137 |
| | | | | | | 474/82 |
| 4,486,182 | A | * | 12/1984 | Coue | .................... | B62M 9/1342 |
| | | | | | | 474/78 |
| 4,675,952 | A | * | 6/1987 | Nagano | .................. | B62M 9/135 |
| | | | | | | 24/278 |
| 5,971,860 | A | * | 10/1999 | Medal | ..................... | B21C 51/00 |
| | | | | | | 411/8 |
| 6,270,124 | B1 | * | 8/2001 | Nanko | ................... | B62M 9/135 |
| | | | | | | 24/274 WB |
| 6,612,950 | B2 | * | 9/2003 | Nanko | ................... | B62M 9/135 |
| | | | | | | 474/80 |
| 7,331,890 | B2 | * | 2/2008 | Ichida | .................... | B62M 9/132 |
| | | | | | | 474/80 |
| 7,503,863 | B2 | * | 3/2009 | Ichida | .................... | B62M 9/132 |
| | | | | | | 474/70 |

(Continued)

FOREIGN PATENT DOCUMENTS

EP 1787902 A2 5/2007

*Primary Examiner* — Henry Y Liu
(74) *Attorney, Agent, or Firm* — Global IP Counselors, LLP

(57) ABSTRACT

A bicycle front derailleur basically includes a base member, a chain guide, a linkage assembly and a support structure. The base member is configured to be mounted to a bicycle frame. The linkage assembly movably couples the chain guide to the base member to move relative to the base member between a retracted position and an extended position. The support structure includes a support member and a contact member. The support member is configured to be mounted to the base member and to advance toward the bicycle frame in a first direction. The contact member includes a contact part and a coupling part extending from the contact part. The contact part is configured to contact the support member and the bicycle frame. The coupling part is configured to be movably coupled to the base member.

29 Claims, 10 Drawing Sheets

(56) References Cited

U.S. PATENT DOCUMENTS

| | | | | |
|---|---|---|---|---|
| 7,651,424 B2* | 1/2010 | Yamamoto | | B62M 9/1342 474/82 |
| 7,704,172 B2* | 4/2010 | Tetsuka | | B62M 9/135 403/59 |
| 7,704,173 B2* | 4/2010 | Ichida | | B62M 25/08 474/80 |
| 7,722,487 B2* | 5/2010 | Ichida | | B62M 9/135 474/80 |
| 7,779,724 B2* | 8/2010 | Fujii | | B62M 25/08 192/217 |
| 7,867,118 B2* | 1/2011 | Yamamoto | | B62M 9/136 474/80 |
| 8,303,443 B2* | 11/2012 | Wickliffe | | B62M 9/1342 474/80 |
| 8,574,105 B2* | 11/2013 | Auer | | B62M 9/135 474/80 |
| 8,808,123 B2* | 8/2014 | Inoue | | B62M 9/136 474/80 |
| 8,864,611 B2* | 10/2014 | Kuwayama | | B62M 9/135 474/80 |
| 8,888,620 B2* | 11/2014 | Emura | | B62M 9/135 474/80 |
| 9,873,482 B2* | 1/2018 | Nishino | | B62M 9/132 |
| 2004/0185975 A1* | 9/2004 | Chen | | B62M 9/1344 474/80 |
| 2005/0143206 A1* | 6/2005 | Tetsuka | | B62M 9/135 474/80 |
| 2005/0204846 A1* | 9/2005 | Valle | | B62M 9/135 74/469 |
| 2007/0117666 A1* | 5/2007 | Ichida | | B62M 9/135 474/80 |
| 2013/0085024 A1* | 4/2013 | Inoue | | B62M 9/134 474/80 |
| 2014/0155205 A1* | 6/2014 | Kuwayama | | B62M 9/1344 474/80 |

* cited by examiner

BICYCLE FRONT DERAILLEUR

CROSS-REFERENCE TO RELATED APPLICATIONS

This application claims priority to Chinese Patent Application No. 2016100829803, led on Feb. 5, 2016. The entire disclosure of Chinese Patent Application No. 2016100829803 is hereby incorporated herein by reference.

BACKGROUND

Field of the Invention

The present invention relates to the field of bicycles, and more particularly, to a bicycle front derailleur.

Background Information

Multi-speed bicycles have increasingly become a transportation and entertainment tool for people. The multi-speed bicycle has a shifting device, and the shifting device comprises a bicycle front derailleur and a bicycle rear derailleur for shifting chain. The bicycle front derailleur shifts, a driving chain from one sprocket to another of a multistage sprocket assembly via a chain guide which constitutes a part of the front derailleur.

A bicycle front derailleur can be connected to a bicycle frame (specifically, connected to a seat tube) by a fixing bracket. The fixing bracket is fastened to the bicycle frame by welding, threaded fasteners or the like. In this case, it is desirable that the bicycle front derailleur can be adjusted relative to the fixing bracket, in order to achieve position and orientation adjustment of the bicycle front derailleur relative to the bicycle frame. In addition, it is also desirable that the bicycle front derailleur can be stably supported on the bicycle frame after the adjustment.

SUMMARY

The present invention aims to provide a bicycle front derailleur, which not only can be easily and quickly adjusted with respect to a bicycle frame, but also can be stably supported on the bicycle frame.

According to the first aspect of the present invention, a bicycle front derailleur is provided. The bicycle front derailleur comprises a base member, a chain guide, a linkage assembly and a support structure. The base member is configured to be mounted to a bicycle frame. The linkage assembly is configured to movably couple the chain guide to the base member so that the chain guide is movable relative to the base member between a retracted position and an extended position. The support structure includes a support member and a contact member. The support member is configured to be mounted to the base member and to advance toward the bicycle frame in a first direction. The contact member includes a contact part and a coupling part extending from the contact part. The contact part is configured to contact the support member and the bicycle frame, and the coupling part is configured to be movably coupled to the base member. Thus, the support structure can be conveniently adjusted according to the position adjustment of the base member relative to the bicycle frame. In addition, the contact member can be easily connected to the base member via the coupling part, which therefore, on the one hand, can save the time for positioning the contact part, and on the other hand, can prevent the contact member from dropping out of the base member.

According to the second aspect of the present invention, the bicycle front derailleur according to the first aspect is configured such that the base member includes a first receiving part and the coupling part of the contact member is configured to be inserted into the first receiving part. This therefore greatly facilitates the coupling of the contact member and the positioning of the contact part, and improves assembly efficiency.

According to the third aspect of the present invention, the bicycle front derailleur according to the second aspect is configured such that the base member includes a second receiving part and the support member is configured to be inserted into the second receiving part. This therefore facilitates the coupling of the support member and improves assembly efficiency.

According to the fourth aspect of the present invention, the bicycle front derailleur according to the third aspect is configured such that the first receiving part is disposed above the second receiving part in a state where the base member is mounted to the bicycle frame. Thus, the support member located in the second receiving part can more stably contact and support the contact member.

According to the fifth aspect of the present invention, the bicycle front derailleur according to the third aspect is configured such that the first receiving part and the second receiving part extend in a direction along the first direction. Thus, the contact part of the contact member coupled to the first receiving part and the support member coupled to the second receiving part can more accurately face the bicycle frame, so as to provide better support for the bicycle front derailleur.

According to the sixth aspect of the present invention, the bicycle front derailleur according to the fifth aspect is configured such that the first receiving part and the second receiving part extend substantially parallel to each other. Thus, the support member coupled to the second receiving part can substantially perpendicularly contact the contact part of the contact member in the first receiving part, so that the support of the support member is more effective.

According to the seventh aspect of the present invention, the bicycle front derailleur according to the second aspect is configured such that the coupling part includes at least one first protrusion configured to engage the first receiving part of the base member to prevent the coupling part from dropping out of the first receiving part.

According to the eighth aspect of the present invention, the bicycle front derailleur according to the seventh aspect is configured such that the coupling part is configured to be at least partly elastically deformable so that the at least one first protrusion is displaceable. Accordingly, the coupling part which is at least partly elastically deformable makes it easy to couple the contact member to the base member.

According to the ninth aspect of the present invention, the bicycle front derailleur according to the eighth aspect is configured such that the coupling part comprises two branches which extend from the at least one first protrusion and which are parallel to each other. This kind of coupling part comprising branches has a simple structure and a low manufacturing cost.

According to the tenth aspect of the present invention, the bicycle front derailleur according to the ninth aspect is configured such that the two branches are elastically deformable. Elastic deformation of the branches can make the coupling between the contact member and the base member easier and more stable.

According to the eleventh aspect of the present invention, the bicycle front derailleur according to the seventh aspect is configured such that the first receiving part is a hole, an end of the hole facing the contact member is formed with at least one second protrusion which is configured to stop a movement of the coupling part within the hole by an engagement with the at least one first protrusion. This structure not only enables the contact member to be slidable along the hole, but also can effectively prevent the contact member from dropping out of the base member.

According to the twelfth aspect of the present invention, the bicycle front derailleur according to the second aspect is configured such that the coupling part is coupled to the base member via a fixing bolt which is used for fixing the base member to a mounting bracket of the bicycle frame. Thus, the contact member and the mounting bracket are coupled to the base member via a common fixing bolt. That is, the contact member is coupled to the base member using an existing fixing bolt, so as to achieve stable coupling without adding any additional members.

According to the thirteen aspect of the present invention, the bicycle front derailleur according to the twelfth aspect is configured such that the coupling part has an opening through which the fixing bolt passes. Therefore, it makes the coupling between the contact member and the base member firmer, thereby providing more stable support for the bicycle front derailleur.

According to the fourteenth aspect of the present invention, the bicycle front derailleur according to the thirteenth aspect is configured such that the opening is an elongated slot configured such that a position of the coupling part is adjustable along the slot. Thus, the coupling part can be conveniently adjusted according to the position adjustment of the base member relative to the bicycle frame, thereby providing support for the adjusted bicycle front derailleur.

According to the fifteenth aspect of the present invention, the bicycle front derailleur according to the second aspect is configured such that the coupling part is coupled to the base member via at least one of a low adjustment bolt and a top adjustment bolt which are used for adjusting the retracted position and the extended position of the chain guide respectively. Thus, the contact member is coupled to the base member using the existing low adjustment bolt and top adjustment bolt, so as to achieve stable coupling without adding any additional members.

According to the sixteenth aspect of the present invention, the bicycle front derailleur according to the fifteenth aspect is configured such that the coupling part has an opening through which at least one of the low adjustment bolt and the top adjustment bolt passes. The low adjustment bolt and/or the top adjustment bolt can be used to fix the coupling part when fitting the contact part between the bicycle frame and the support member, which will make the fitting easier.

According to the seventeenth aspect of the present invention, the bicycle front derailleur according to the sixteenth aspect is configured such that the opening is an elongated slot configured so that a position of the coupling part is adjustable along the slot. Thus, the coupling part can be conveniently adjusted according to the position adjustment of the base member relative to the bicycle frame, thereby providing support for the adjusted bicycle front derailleur.

According to the eighteenth aspect of the present invention, the bicycle front derailleur according to the seventeenth aspect is configured such that the coupling part is configured to be removed from at least one of the low adjustment bolt and the top adjustment bolt after the contact part is fitted between the bicycle frame and the support member. Therefore, the coupling part will not affect the design of the front derailleur.

According to the nineteenth aspect of the present invention, the bicycle front derailleur according to the first aspect is configured such that the contact part and the coupling part are separate members and attached to each other. Thus, it is possible to provide more choices for the user when forming and assembling the contact part and the coupling part.

According to the twentieth aspect of the present invention, the bicycle front derailleur according to the nineteenth aspect is configured such that the contact part and the coupling part are made of different materials. Thus, the manufacturing cost can be reduced.

According to the twenty-first aspect of the present invention, the bicycle front derailleur according to the twentieth aspect is configured such that the coupling part is made of flexible material, which therefore makes it easier to adjust the contact member.

According to the twenty-second aspect of the present invention, the bicycle front derailleur according to the twenty-first aspect is configured such that the coupling part is made from a plastic plate or film. Plastic materials enable the coupling part to have better flexibility, and make the manufacturing cost lower.

According to the twenty-third aspect of the present invention, the bicycle front derailleur according to the twenty-first aspect is configured such that the contact part is made of metallic material. Metallic materials enable the support structure to provide stronger support for the bicycle front derailleur, and can improve the durability of the contact member.

According to the twenty-fourth aspect of the present invention, the bicycle front derailleur according to the first aspect is configured such that the contact part and the coupling part are integrally formed as one piece. Therefore, the contact member can be molded in one step, which makes the manufacturing easier.

According to the twenty-fifth aspect of the present invention, the bicycle front derailleur according to the first aspect is configured such that the contact member is a plate with an "L" shape. This plate can be obtained by a simple method, which makes the manufacturing of the contact member easier.

According to the twenty-sixth aspect of the present invention, the bicycle front derailleur according to the first aspect is configured such that the contact member is one of stamped member and a molded member. This therefore can make the manufacturing of the contact member easier with lower cost.

According to the twenty-seventh aspect of the present invention, the bicycle front derailleur according to the first aspect is configured such that the support member is a bolt. Thus, the support member can be coupled to the base member in a simple manner of threaded connection, and is easy to adjust in the first direction.

According to the twenty-eighth aspect of the present invention, the bicycle front derailleur according to the first aspect is configured such that the base member includes a mounting portion configured to be fixed to a mounting bracket of the bicycle frame via a fixing bolt, the mounting bracket having a curved surface. Thus, the base member can be fixed to the bicycle frame via the mounting bracket.

According to the twenty-ninth aspect of the present invention, the bicycle front derailleur according to the twenty-eighth aspect is configured such that the mounting portion includes a threaded portion into which the fixing bolt is to be threaded in a second direction different from the first direction. Thus, the coupling of the base member to the mounting bracket and the position adjustment of the base member relative to the mounting bracket can be performed independently from the adjustment of the support structure.

According to the thirtieth aspect of the present invention, the bicycle front derailleur according to the twenty-ninth aspect is configured such that at least one of an angular position and vertical position of the base member is adjustable with respect to the mounting bracket. Thus, the position of the bicycle front derailleur relative to the sprocket can be adjusted.

The bicycle front derailleur according to the present invention can have one or more of the following advantages:

When the chain guide is at the extended position, the support structure formed by the support member and the contact member can provide more stable support for the bicycle front derailleur.

According to the present invention, after the angular position and/or vertical position of the base member with respect to the mounting bracket is adjusted, the position of the support structure can be adjusted accordingly, thereby supporting the bicycle front derailleur.

In addition, the contact member can be coupled to the base member and positioned in the base member by being simply inserted into the first receiving part, thereby greatly improving the assembly efficiency.

BRIEF DESCRIPTION OF THE DRAWINGS

The accompanying drawings constitute a part of the present description and are used to provide further understanding of the present invention. Such accompanying drawings illustrate the examples of the present invention and are used to describe the principles of the present invention together with the description. In the accompanying drawings, same components are represented with same reference numbers. In the drawings.

DETAILED DESCRIPTION OF THE EMBODIMENTS

Selected examples will now be explained with reference to the drawings. It will be apparent to a person skilled in the art from this disclosure that the following descriptions of the examples are provided for illustration only and not for the purpose of limiting the present invention as defined by the appended claims and their equivalents.

Figure 1:
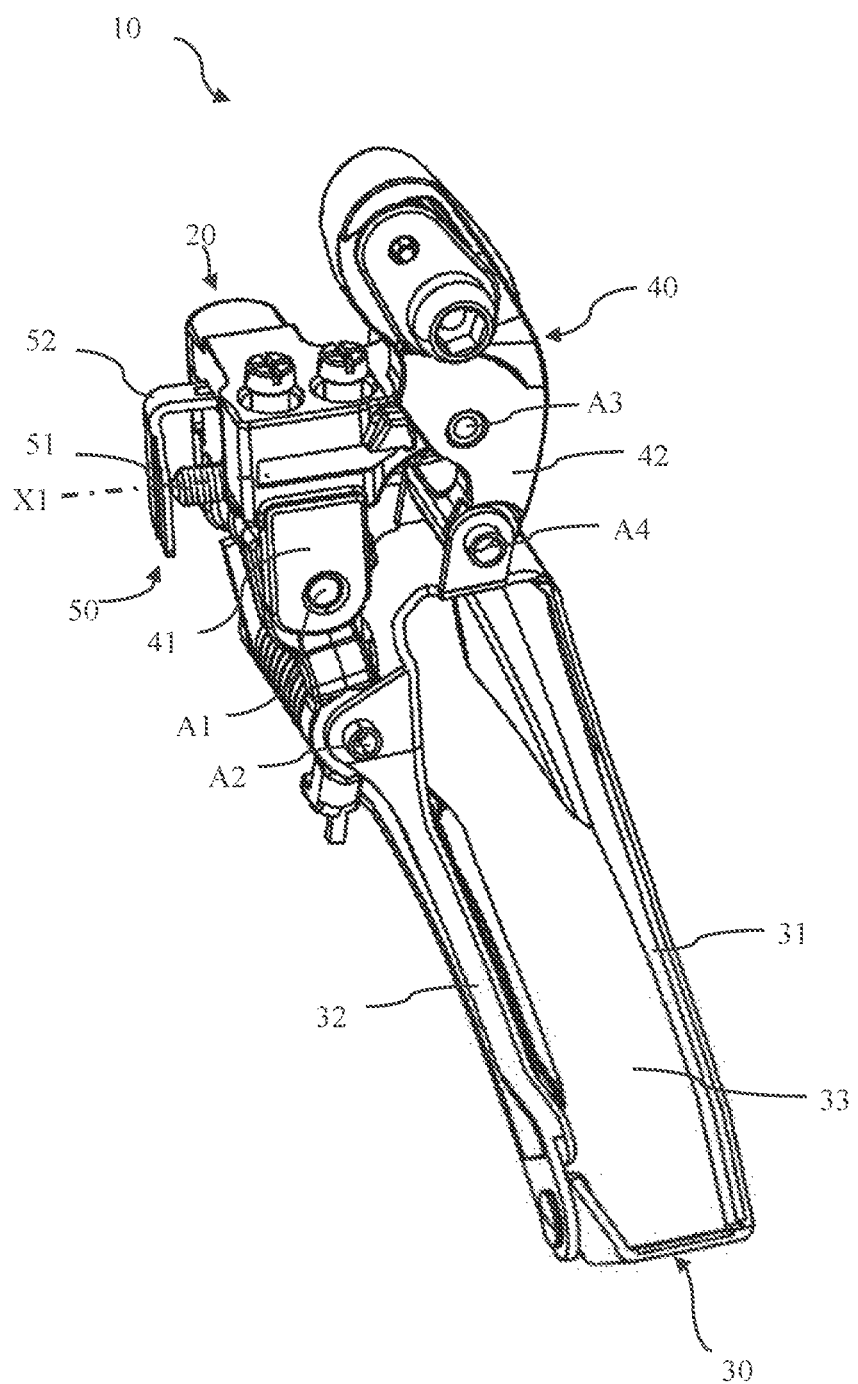
FIG. 1 is a perspective view showing a bicycle front derailleur according to a first embodiment.
Figure 2:
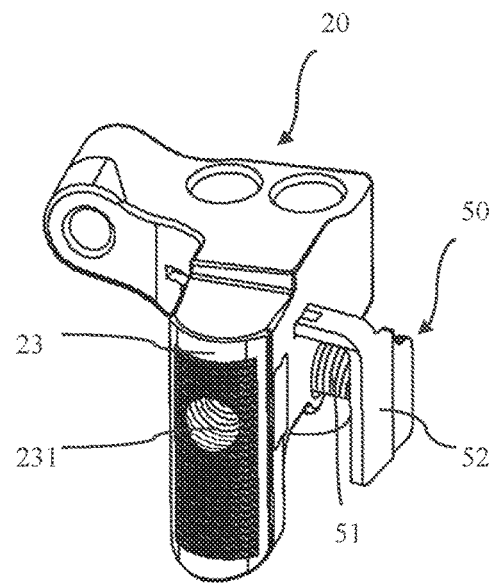
FIG. 2 is a perspective view showing a base member and a support structure coupled to the base member of the bicycle front derailleur according to the first embodiment.

Referring initially to FIG. 1, a bicycle front derailleur 10 is illustrated according to a first embodiment. In FIG. 1, the front derailleur 10 is a downswing-type derailleur. Generally, the front derailleur 10 basically comprises a base member 20, a chain guide 30, a linkage assembly 40 and a support structure 50. Next, these parts will be specifically described.

Figure 6:
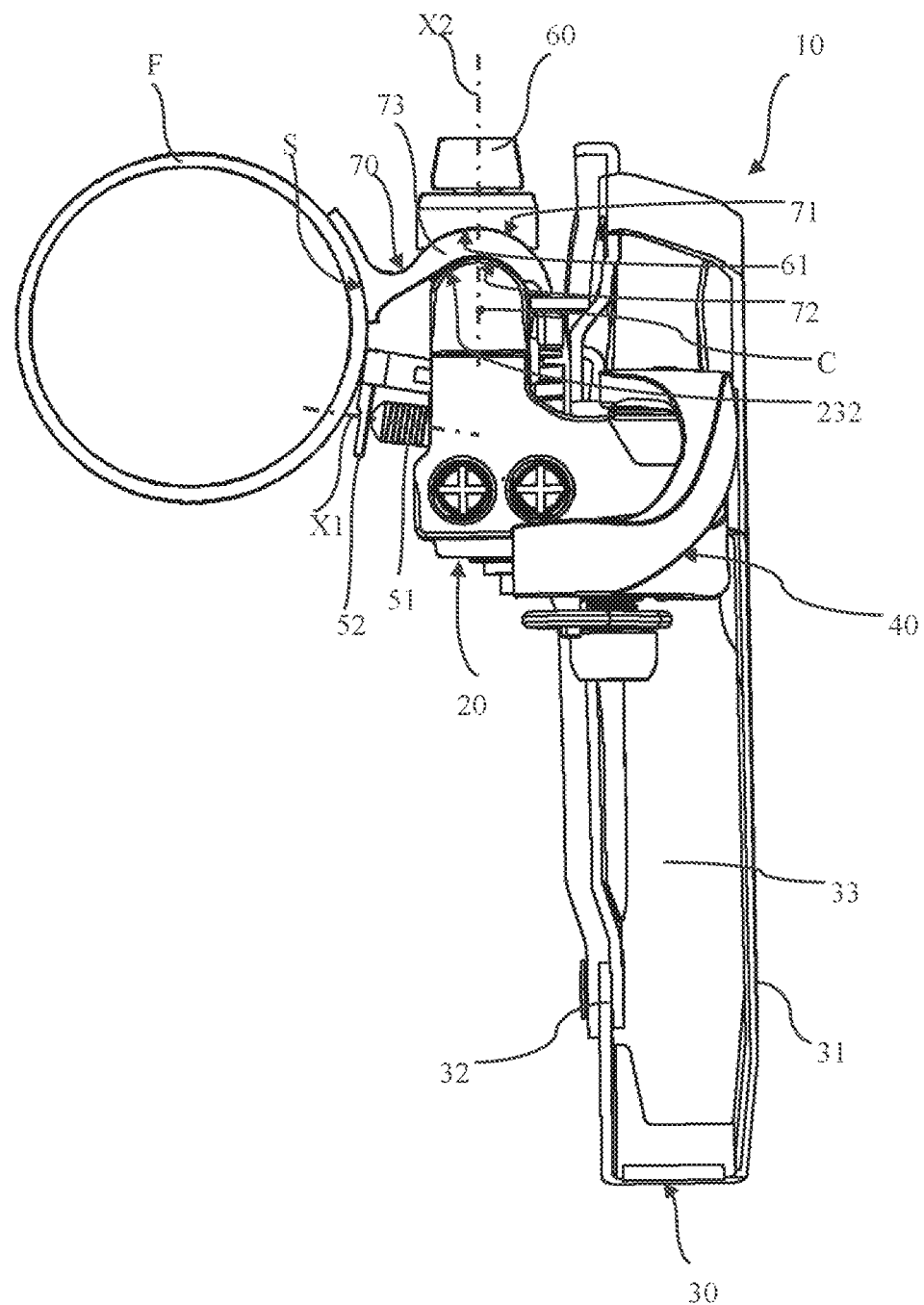
FIG. 6 is a top view showing the bicycle front derail according to the first embodiment which is mounted to the bicycle frame.
Figure 7:
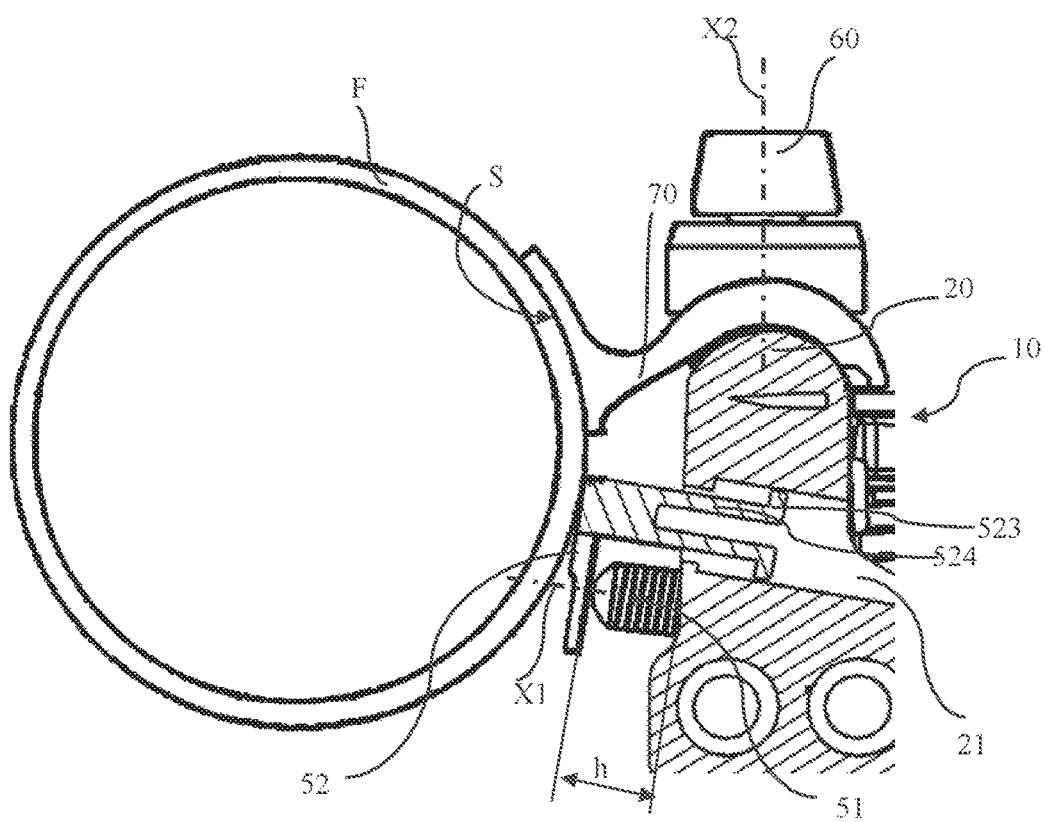
FIG. 7 is a top view showing the bicycle front derailleur according to the first embodiment which is mounted to the bicycle frame, wherein only a part of the bicycle front derailleur is shown in an enlarged sectional view for the sake of clarity.
Figure 8:
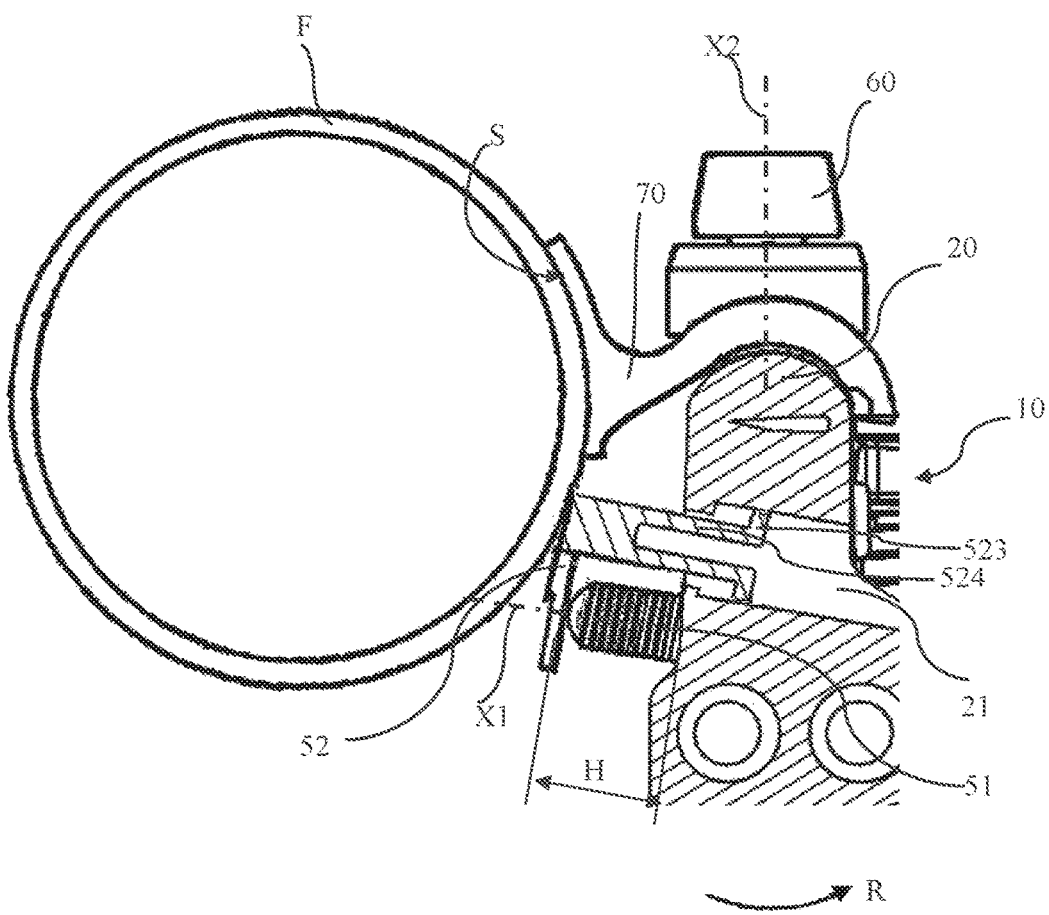
FIG. 8 is a top view showing the bicycle front derailleur according to the first embodiment which is mounted to the bicycle frame, wherein as compared with FIG. 7, the bicycle front derailleur is adjusted by a certain angle along an arrow R, and for the sake of clarity, only a part of the bicycle front derailleur is shown in an enlarged sectional view.

The base member 20 is configured to be mounted to the bicycle frame F. More specifically, the base member 20 includes a mounting portion 23 configured to be fixed to a mounting bracket 70 of the bicycle frame F via a fixing bolt 60 (as shown in FIGS. 6-8). In the present embodiment, the mounting bracket 70 can be fixedly coupled to the bicycle frame by means of welding or riveting for example. The coupling between the base member 20 and the mounting bracket 70 will be described later.

The chain guide 30 is used for guiding a chain (not shown), thereby selectively shifting the chain onto a proper sprocket (not shown). The chain guide 30 is free with respect to the base member 20. In the present embodiment, referring to FIGS. 1 and 6, the chain guide 30 has an outer plate 311 and an inner plate 32. A chain receiving slot 33 is defined between the outer plate 31 and the inner plate 32. The outer plate 31 is disposed at the outside and the inner panel 32 is disposed at the inside with respect to the bicycle frame F.

The linkage assembly 40 is configured to movably couple the chain guide 30 to the base member 20 so that the chain guide 30 is movable relative to the base member 20 between a retracted position and an extended position. More specifically, as shown in FIG. 1, the base member 20, an inner linkage member 41, an outer linkage member 42 and the chain guide 30 are connected together via a plurality of pivot pins A1, A2, A3 and A4. The pivot pins A1, A2, A3 and A4 extend along a same direction. In the illustrated embodiment, the pivot pins A1, A2, A3 and A4 are arranged to extend substantially parallel to each other. Thus, the base member 20, the inner linkage member 41, the outer linkage member 42 and the chain guide 30 form a four-bar linkage mechanism defined by the pivot pins A1, A2, A3 and A4. An inner wire of a control cable (not shown) for controlling the front derailleur 10 can be fixed by a cable fixing bolt disposed on an upper end of the outer linkage member. Thus, when a user operates the control cable by a shifting operation device (not shown) located on the handlebar, the cable will pull the outer linkage member 42 to rotate, so as to move, via the four bar linkage mechanism, the chain guide 30 to swing relative to the base member 20 between the retracted position close to the bicycle frame and the extended position distant from the bicycle frame F. Thereby, the chain (not shown) is selectively shifted to a proper sprocket (not shown).

Referring to FIGS. 2-8, the support structure 50 includes a support member 51 and a contact member 52. The support member 51 is configured to be mounted to the base member 20. The support member 51 is configured to advance toward the bicycle frame F in a first direction X1. The contact member 52 includes a contact part 521 and a coupling part 522 extending from the contact part 521. The contact part 521 is configured to contact the support member 51 and the bicycle frame F, and the coupling part 522 is configured to be movably coupled to the base member 20.

The support member 51 and the contact member 52 of the support structure 50 are both coupled to the base member 20. The specific shape and structure of the support member 51 and the contact member 52, and their coupling to the base member 20 are now described in details.

As can be seen from the figures, the contact member 52 is formed as a plate in a substantially "L" shape.

Firstly, the shape of the contact part 521 of the contact member 52 will be described with reference to the figures. In the present embodiment, the contact part 521 can be formed in a planar shape, so that the contact part 521 can contact, the bicycle frame F in a manner of being tangential to the circular cross section.

However, the present invention is not limited to this configuration. Alternatively, the contact part can also be formed in a curved shape. Preferably, the curved shape conforms to the circular cross section of the bicycle frame F, so that the contact part can contact the bicycle frame F in a manner of snugly fitting with the circular cross section, and thus forming a more stable contact. Of course, it will be apparent from this disclosure that those skilled in the art can also make other changes. For example, the shape of the contact part 521 of the contact member 52 can be determined in accordance with the shape of the bicycle frame F (specifically the shape of the seat tube). For example, when the seat tube adopts different cross sections such as a cross section having a polygonal shape or a stepped shape, the shape of the contact part can be varied accordingly in order to match the seat tube, as long as the contact part 521 can stably contact the bicycle frame F. However, generally, if the shape of the contact part is planar or curved, it will fit any type of bicycle frame.

Next, the structure of the coupling part 522 of the contact member 52, and its coupling to the base member 20 will be described with reference to the figures.

The base member 20 includes a first receiving part 21, and the coupling part 522 of the contact member 52 is configured to be inserted into the first receiving part 21. As more clearly shown in FIGS. 3 and 5, the coupling part 522 includes at least one first protrusion 523. The at least one first protrusion 523 can be configured to engage the first receiving part 21 of the base member 20 to prevent the coupling part 522 from dropping out of the first receiving part 21.

Figure 5:
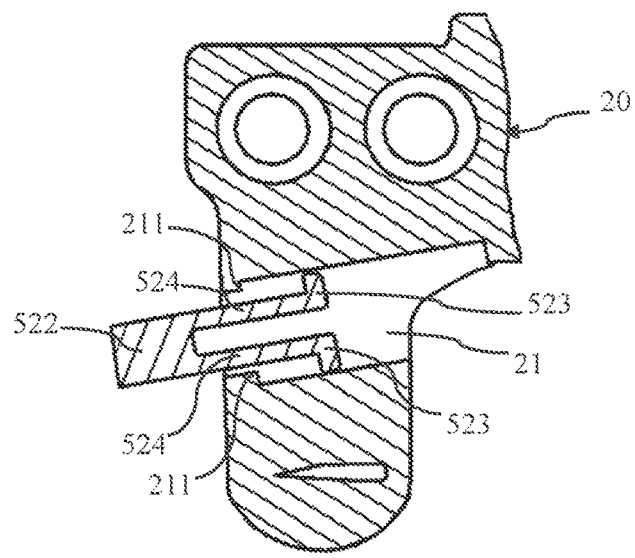
FIG. 5 is a sectional view showing the coupling structure of the base member and the contact member of the bicycle front derailleur according to the first embodiment taken along a section line I-I in FIG. 4.

Specifically, as shown in FIG. 5, the first receiving part 21 can be formed as a hole, and the at least one first protrusion 523 of the coupling part 522 can be inserted into the hole. In this way, after the coupling part 522 is coupled to the first receiving part 21 of the base member 20, the coupling part 522 can slide along the hole in the first direction X1. An end of the hole facing the contact member 52 is formed with at least one second protrusion 211. The at least one second protrusion 211 is configured to stop a movement of the coupling part 522 within the hole by an engagement with the at least one first protrusion 523. That is, the coupling part 522 can slide toward or away from the bicycle frame F along the hole in the first direction X1, and when the at least one first protrusion 523 abuts the at least one second protrusion 211, the sliding is stopped, thereby preventing the coupling part 522 from dropping out of the first receiving part 21.

The coupling part 522 is configured to be at least partly elastically deformable so that the at least one first protrusion 523 is displaceable. Thereby it facilitates to couple the coupling part 522 (particularly the at least one second protrusion 211 of the coupling part 522) into the first receiving part 21 of the base member 20.

Figure 3:
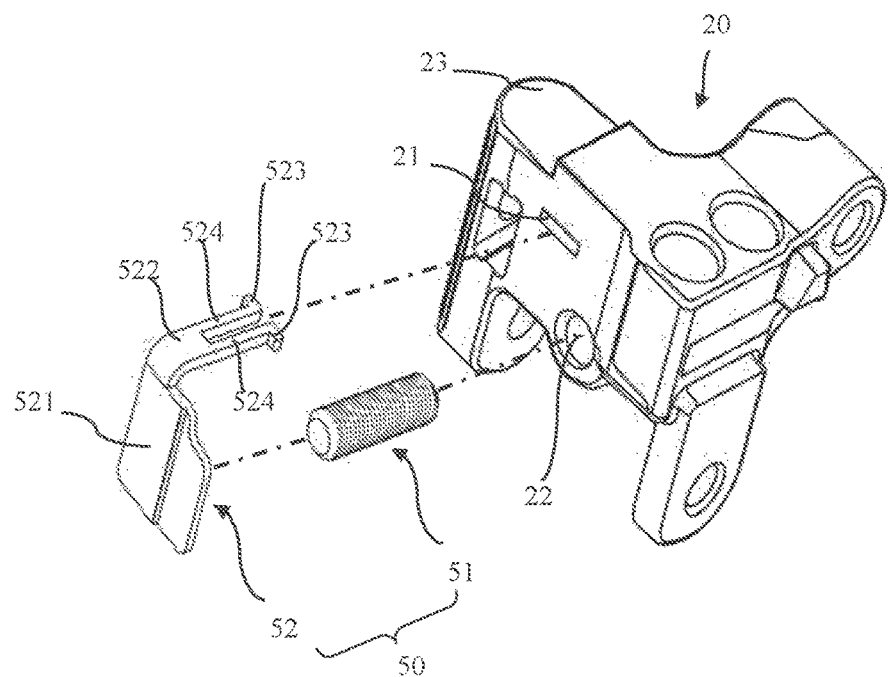
FIG. 3 is an exploded perspective view showing the base member and the support structure coupled to the base member of the bicycle front derailleur according to the first embodiment.
Figure 4:
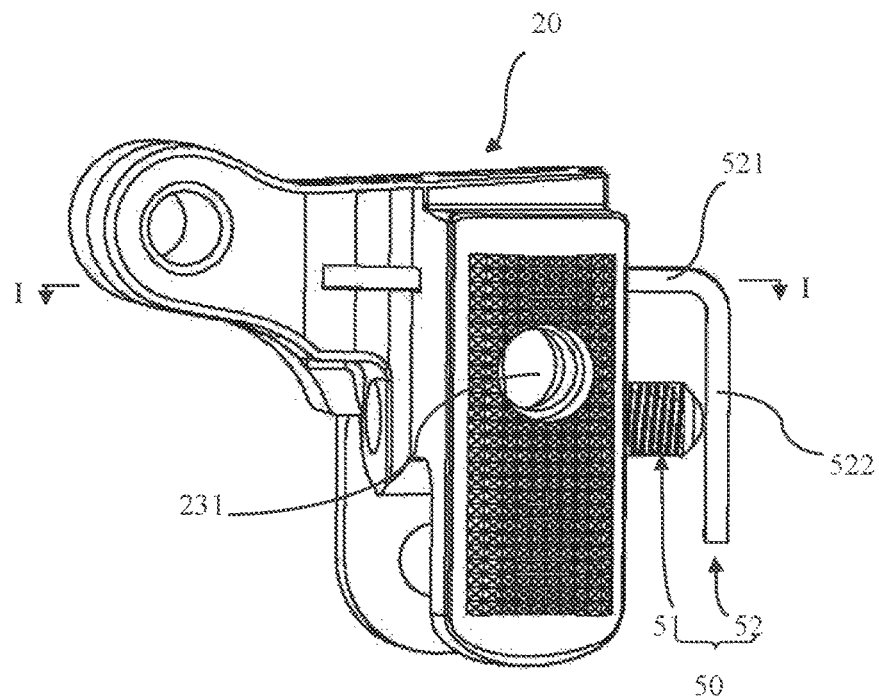
FIG. 4 is a front view showing the base member and the support structure coupled to the base member of the bicycle front derailleur according to the first embodiment.

Specifically, as shown in FIGS. 3 and 5, the coupling part 522 comprises two branches 524. The two branches extend from the at least one first protrusion 523 and the two branches are parallel to each other. The two branches are elastically deformable, so that it is possible to insert the at least one first protrusion 523 into the first receiving part 21.

In the present embodiment, the contact part 521 and the coupling part 522 can be integrally formed as one piece. In this case, the contact part 521 and the coupling part 522 can preferably be made of a same material. Further, the contact member 52 can be preferably formed as a stamped member by stamping or as a molded member by molding. For example, the contact member 52 can be formed using a metal plate or a plastic plate by stamping. As described above, preferably, the contact member 52 can be in a substantially "L" shape so as to be a plate with an "L" shape. More preferably, the contact part 521 is substantially perpendicular to the coupling part 522. Further, the width of the contact part 521 is preferably greater than the width of the coupling part 522, so that it is possible to ensure that the contact part 521 contact the bicycle frame F more effectively.

Figure 9:
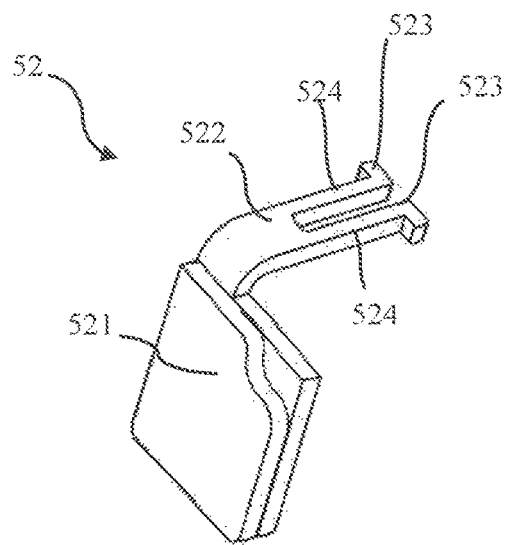
FIG. 9 is perspective view showing a variation of the contact member according to the first embodiment.

However, the present invention is not limited to this configuration. As to the contact member 52, as schematically shown in FIG. 9, the contact part 521 and the coupling part 522 can be separate members and attached to each other. In this case, the contact part 521 and the coupling part 522 can be made of a same material. However, alternatively, the contact part 521 and the coupling part 522 can be made of different materials. For example, the coupling part 522 can be made of flexible material. Especially, the coupling part 522 can be made from a plastic plate or film. For example, the contact part 521 is made of metallic material. Preferably, the contact part 521 and the coupling part 522 can be separately formed as a stamped member by stamping or as a molded member by molding, and then adhered to each other by adhesives. In this case, the contact member 52 formed by the contact part 521 and the coupling part 522 which are adhered to each other can also be in a substantially "F" shape so as to be a plate with an "L" shape.

Next, the structure of the support member 51, and its coupling to the base member 20 will be described with reference to the figures.

The base member 20 includes a second receiving part 22, and the support member 51 is configured to be inserted into the second receiving part 22. In the present embodiment, the support member 51 can be formed as a bolt. Accordingly, the second receiving part 22 can be formed as a threaded hole, whereby the support member 51 formed as a bolt can be threaded in the threaded hole, so that the bolt can advance toward the bicycle frame F in the first direction X1. Preferably, an end of the support member 51 for abutting the contact member 52 can have a hemispherical or spherical shape, so as to form a more effective support for the contact member 52. Of course, the support member 511 can also adopt other structures, as long as it can advance toward the bicycle frame F in the first direction X1, and can support the contact member 52.

In the present embodiment, the first receiving part 21 is disposed above the second receiving part 22 in a state where the base member 20 is mounted to the bicycle frame F. Preferably, the first receiving part 21 and the second receiving part 22 extend in a direction along the first direction X1. More preferably, the first receiving part 21 and the second receiving part 22 extend substantially parallel to each other.

However, the present invention is not limited to this configuration. For example, the first receiving part 21 can also be disposed below the second receiving part 22. In this case, the support member can be inverted with respect to the support member as shown in FIGS. 1-8 in the present embodiment. Of course, those skilled in the art can also provide the first receiving part 21 and the second receiving part 22 in other ways as needed.

The coupling of the front derailleur 10 according to the present embodiment to the bicycle frame F is now described in details. More specifically, the connection between the base member 20 and the mounting bracket 70 will be described in details.

As described above, the base member 20 is mounted to the bicycle frame F via the mounting bracket 70. Preferably, as shown in FIGS. 6-8, the mounting bracket 70 has a curved surface S which can cooperate with the bicycle frame F having a circular cross section and be fixed to the bicycle frame F. Preferably, the curved surface S is dimensioned to allow to be mounted on an outer circumferential surface equal to approximately a quarter circle of the bicycle frame F. The curved surface S can be welded to the bicycle frame F.

The mounting portion 23 of the base member 20 includes a threaded portion 231 into which the fixing bolt 60 is to be threaded in a second direction X2 different from the first direction X1. Thus, the front derailleur 10 can be fixed to the mounting bracket 70 of the bicycle frame F via the fixing bolt 60 coupled to the threaded portion 231.

In the present embodiment, an angular position and/or vertical position of the base member 20 with respect to the mounting bracket 70 is adjustable, which thereby can realize position adjustment of the front derailleur 10 with respect to the bicycle frame F. However, since the position of the mounting bracket 70 cannot be adjusted after welding, the position of the front derailleur 10 needs to be adjusted by the mounting portion 23 of the base member 20 coupled to the mounting portion 70.

Specifically, the mounting bracket 70 has an arcuate portion at an end opposite to the curved surface S. Preferably, the arcuate portion has arc surfaces 71 and 72 with an adjustment axis C as a center. As shown in FIGS. 6-8, the adjustment axis C is substantially parallel to an axis of the bicycle frame F (i.e., seat tube). The adjustment axis C is disposed at a distance from the bicycle frame F. Accordingly, the fixing bolt 60 has a arc surface 61 with the adjustment axis C as a center so as to be snugly fitted to the arc surface 71 of the mounting bracket 70, and the mounting portion 23 has a arc surface 232 with the adjustment axis C as a center so as to be snugly fitted to the arc surface 72 of the mounting bracket 70.

In addition, the arcuate portion 73 of the mounting bracket 70 is formed with a slot (not shown) which allows the fixing bolt 60 for fastening the front derailleur 10 to pass in a second direction X2 orthogonal to the adjustment axis C. The second direction X2 is different from the first direction X1. Preferably, the first direction X1 and the second direction X2 extend parallel to a reference plane perpendicular to a third direction. The third direction is substantially parallel to a longitudinal direction of the bicycle frame F. For example, the third direction is a direction parallel to the adjustment axis C.

The width of the slot is dimensioned to be significantly greater than the outer diameter of the fixing bolts 60 so as to allow the fixing bolt 60 to obliquely pass through the slot, so that the vertical position and/or angular position of the front derailleur 10 is adjustable. Of course, the present invention is not limited to this configuration. For example, the slot can be omitted, and is replaced with an annular opening, so that the angular position of the mounting portion 23 of the base member 20 is adjustable along the curved surface of the mounting bracket. For example, as shown in FIGS. 7 and 8, the angular position of the base member 20 with respect to the mounting bracket 70 can be adjusted about the adjustment axis C along the arrow R, and then the base member 20 is fixed in place via the fixing bolt 60.

With the above structure, the coupling part is slidable in the first direction as the support member advances toward the bicycle frame F. By the sliding of the coupling part and the supporting of the support member, the contact part contacts and presses against the bicycle frame. Thus, when the front derailleur 10 moves toward the extended position away from the bicycle frame F due to the operation (winding) of the cable, since the contact part contacts and presses against the bicycle frame F, it is possible to prevent the base member 20 from moving toward the bicycle frame F. Thus, the support structure of the present invention can keep the front derailleur 10 in place stably.

Now, how to adjust the front derailleur 10 according to the present invention is described with reference to FIGS. 7-8.

Firstly, the contact member 52 is mounted. Specifically, the two branches 524 of the coupling part 522 of the contact member 52 are elastically deformed, so that the at least one first protrusion 523 is inserted into the first receiving part 21.

Then, the fixing bolt 60 passes through the slot or annular opening formed in the mounting bracket 70 fixed to the bicycle frame F, and the fixing bolt 60 is coupled to the threaded hole 231 of the base member 20. At this time, in order to facilitate the subsequent adjustment of the position of the front derailleur 10, the fixing bolt 60 is only slightly screwed in the threaded hole 231.

Then, the vertical position and/or the angular position of the front derailleur 10 along the adjustment axis C is adjusted so that the front derailleur is situated at a proper position with respect to the sprocket.

Then, the fixing bolt 60 is tightened after the position adjustment of the front derailleur 10 is completed.

Then, the support member 51 is mounted. For example, it is feasible to screw the support member 51 formed as a bolt in the second receiving part 22 formed as a threaded hole by tools such as a screwdriver or a hexagonal wrench, so that the support member 51 can advance toward the bicycle frame F in the first direction X1. When the end of the support member 51 contacts the contact member 52, the advancement of the support member 51 can make the coupling part 522 of the contact member 52 advance in the first receiving part 21 toward the bicycle frame F in the first direction X1.

The support member 51 continues to be screwed until the contact part 521 of the contact member 52 contacts and stably presses against the bicycle frame F.

Through the above steps, the position adjustment of the front derailleur 10 can be achieved. Of course, these steps are merely exemplary, and those skilled in the art can make changes according to the actual situation. For example, when it is desired to adjust the front derailleur 10 in a direction opposite to the arrow 1 in FIG. 8, it is needed to make the support member 511 retract from the bicycle frame F in the first direction X1.

It will be appreciated by those skilled in the art from this disclosure that due to the support structure formed by the support member 51 and the contact member 52, the chain guide 30 can be more stably supported when it is at the extended position, compared to an existing front derailleur without a support structure.

Further, it is clear from the above description that the contact member 52 in the present embodiment can be coupled to the base member 20 and positioned with respect to the base member 20 by being simply inserted into the first receiving part 21, thereby greatly improving the assembly efficiency. Moreover, the at least one first protrusion 523 of the coupling part 522 of the contact member 52 in the present embodiment can effectively prevent the contact member 52 from dropping out of the base member 20. In addition, the contact member 52 in the present embodiment has a simple structure and low manufacturing cost.

The front derailleur 10 according to the first embodiment has been described above with reference to FIGS. 1-9. However, the present invention is not limited to this configuration. In particular, those skilled in the art can vary the support structure of the front derailleur 10 according to the concept of the present invention. Next, the front derailleur 10' according to a second embodiment of the present invention and the front derailleur 10" according to a third embodiment of the present invention will be described with reference to FIGS. 10-15.

The main difference between the second and third embodiments and the first embodiment lies in the coupling parts 522' and 522" of the contact members 52' and 52", while in the second embodiment and the third embodiment, the support member 51' and 51" and the contact parts 521' and 521" of the contact member 52 can be identical or similar to the support member 51 in the first embodiment. Therefore, only the coupling parts 522' and 522" are described in details herein.

Figure 10:
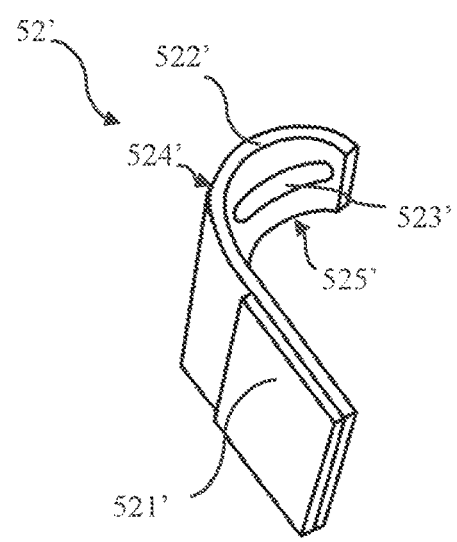
FIG. 10 is a perspective view showing the contact member of the bicycle front derailleur according to a second embodiment.
Figure 11:
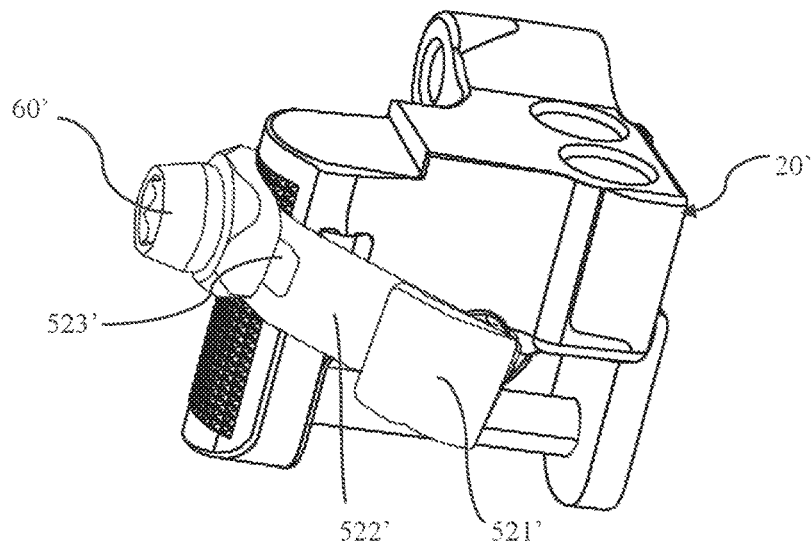
FIG. 11 is a perspective view showing a base member and a support structure coupled to the base member of the bicycle front derailleur according to the second embodiment.
Figure 12:
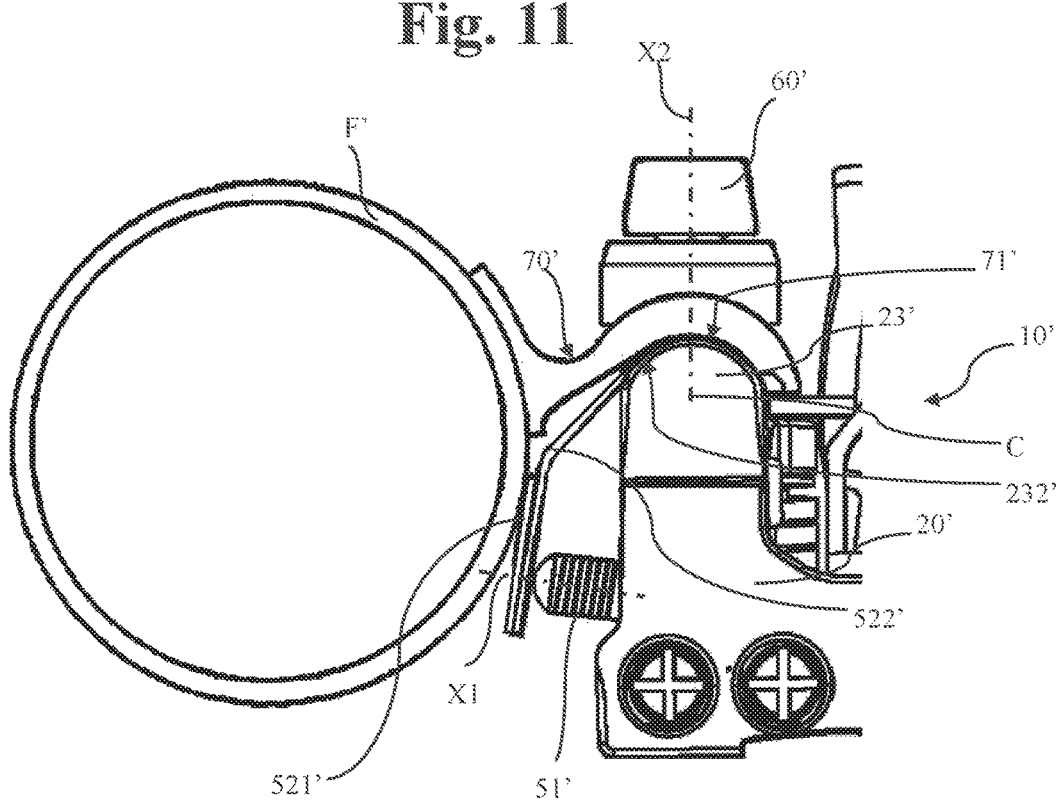
FIG. 12 is a top view showing the bicycle front derailleur according to the second embodiment which is mounted to the bicycle frame, wherein only a part of the bicycle front derailleur is shown in an enlarged sectional view for the sake of clarity.

As shown in FIGS. 10-12, in the front derailleur 10' according to the second embodiment, the coupling part 522' is coupled to the base member 20' via a fixing bolt 60' which is used for fixing the base member 20' to a mounting bracket 70' of the bicycle frame F'. That is, the coupling part 522' and the mounting bracket 70' are coupled to the base member 20' by the same fixing bolt 60', and the coupling part 522' is mounted between the mounting bracket 70' and the base member 20'.

The coupling part 522' can have an arcuate portion. Preferably, the arcuate portion has outer and inner arc surfaces 524', 525' with the adjustment axis C as the center. The arc surfaces 524' 525' are snugly fitted to the arc surface 71' of the mounting bracket 70' and the arc surface 232' of the mounting portion 23', respectively.

The coupling part 522' has an opening 523'. For example, in the present embodiment, the opening 523' can be an elongated slot, such as an annular slot along a longitudinal direction of the coupling part 522'. The fixing bolt 60' passes through the opening 523' to fix the coupling part 522' to the base member 20'. The opening 523' is configured so that the position of the coupling part 522' is adjustable along the slot. Thus, after the position of the front derailleur 10' is adjusted, for example, in a similar way as shown in FIG. 8, the position of the coupling part 522' can be adjusted along the annular opening 523', so that the contact parts 521' can contact and press against the bicycle frame in order to provide support for the front derailleur 10'.

Figure 13:
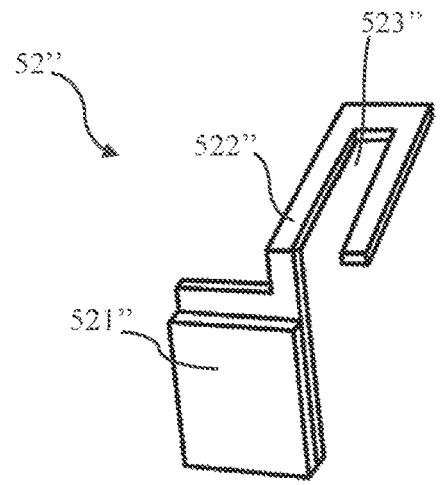
FIG. 13 is a perspective view showing the contact member of the bicycle front derailleur according to a third embodiment.
Figure 14:
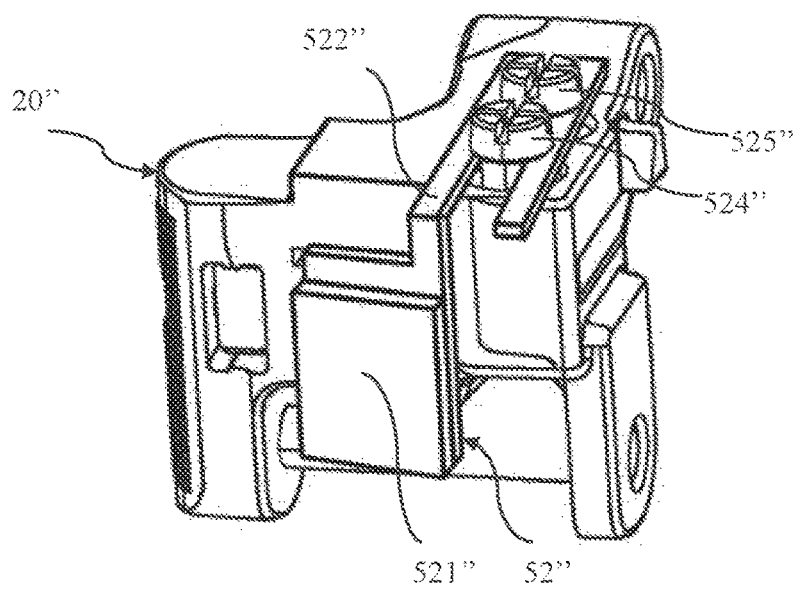
FIG. 14 is a perspective view showing a base member and a support structure coupled to the base member of the bicycle front derailleur according to the third embodiment.
Figure 15:
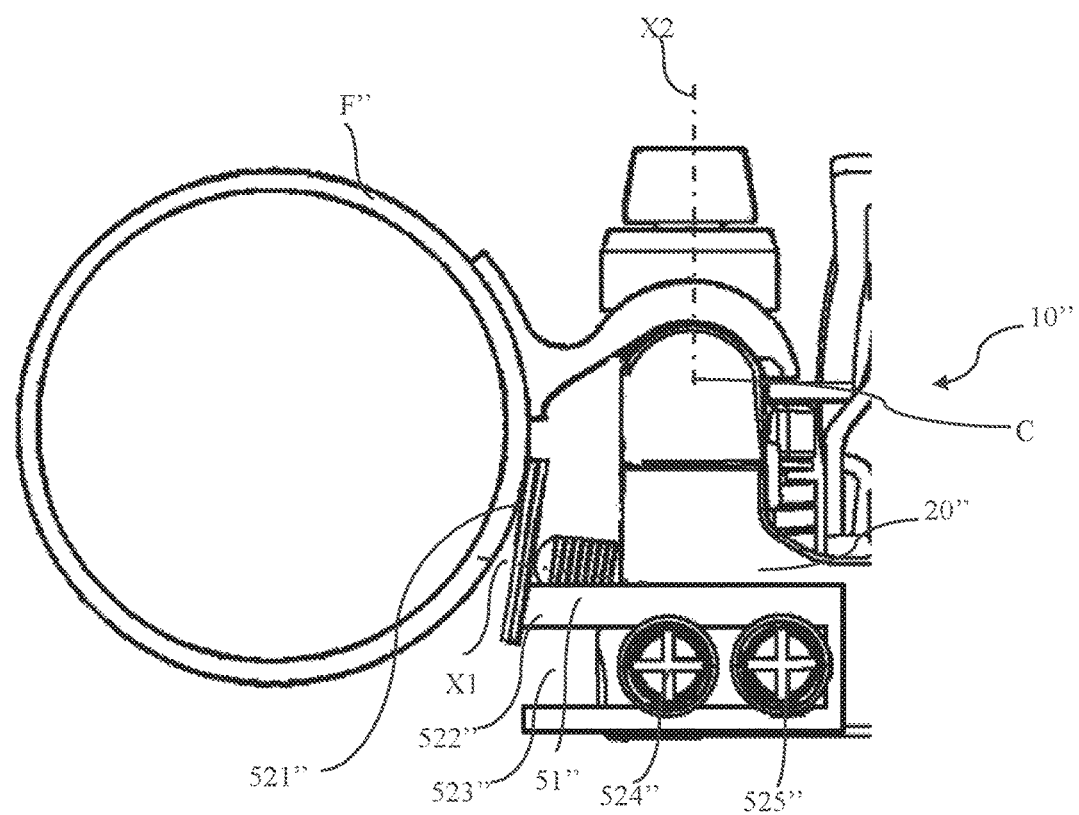
FIG. 15 is a top view showing the bicycle front derailleur according to the third embodiment which is mounted to the bicycle frame, wherein only a part of the bicycle front derailleur is shown in an enlarged sectional view for the sake of clarity.

As shown in FIGS. 13-15, in the front derailleur 10" according to the third embodiment, the coupling part 522" is coupled to the base member 20" via a at least one of a low adjustment bolt 524" and a top adjustment bolt 525" which are used for adjusting the retracted position and the extended position of the chain guide respectively. In particular, the low adjustment bolt 524" is configured to contact at least one of a linkage and a chain guide 30 to define the retracted position of the chain guide 30. The top adjustment bolt 525" is configured to contact at least one of a linkage and a chain guide 30 to define the extended position of the chain guide 30. Each of the top and low adjustment bolts 524" and 525" is movable with respect to the base member 20" to adjust the extended position and the retracted position of the chain guide 30 respectively.

The coupling part 522" has an opening 523". At least one of the low adjustment bolt 524" and the top adjustment bolt 525" passes through the opening 523" to couple the coupling part 522" to the base member 20". For example, in the present embodiment, the opening 523" can be an elongated slot, such as an elongated slot extending along the longitudinal direction of the coupling part 522". The opening 523" is configured so that the position of the coupling part 522" is adjustable along the slot.

Further, the coupling part 522" can be configured to be removed from at least one of the low adjustment bolt 524" and the top adjustment bolt 525" after the contact part 521" is fitted between the bicycle frame 17" and the support member 51". In such a way, the coupling part like a plastic plate (film) will not affect a design of the front derailleur. In such a case, the contact part will not drop since the contact part is fixedly put between the bicycle frame F'" (the seat tube) and the support member 51. Of course, alternatively and functionally, the coupling part 522" can be configured not, to be removed from the low adjustment bolt 524" and/or the top adjustment bolt 525" after the contact part 521" is fitted between the bicycle frame F'" and the support member 51.

As can be seen from the above description, the contact member in the second and third embodiments can be coupled to the base member by using an existing fastening member of the front derailleur, thereby achieving convenience in assembly and low cost.

The contact part and the coupling part in the second and third embodiments can be integrally formed as a single piece, or as separate members attached to each other. The contact part and the coupling part can be formed of a same material or different materials by stamping or molding. These are all similar to the first embodiment, and therefore description is not repeated herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above examples, the following directional terms "forward", "rearward", "above", "downward", "vertical", "horizontal", "below" and "transverse" as well as any other similar directional terms refer to those directions of a bicycle equipped with the front derailleur. Accordingly, these terms, as utilized to describe the front derailleur should be interpreted relative to a bicycle equipped with the front derailleur as used in the normal riding position. Finally, terms of degree such as "substantially", "about", and "approximately" as used herein mean a reasonable amount of deviation of the modified term such that the end result is not significantly changed.

While only selected examples have been chosen to illustrate the present invention, it will be apparent to a person skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one example can be adopted in another embodiment. It is not necessary for all advantages to be present in a particular example at the same time. Every feature which is unique from the prior art, alone or in combination with other features, also should be considered a separate description of further inventions by the applicant, including the structural and/or functional concepts embodied by such feature(s). Thus, the foregoing descriptions of the examples according to the present invention are provided for illustration only, and not for the purpose of limiting the invention as defined by the appended claims and their equivalents.

What is claimed is:

1. A bicycle front derailleur comprising:
   a base member including a mounting portion configured to be fixed to a mounting bracket of a bicycle frame via a fixing bolt, the mounting bracket having a curved surface;
   a chain guide;
   a linkage assembly configured to movably couple the chain guide to the base member so that the chain guide is movable relative to the base member between a retracted position and an extended position; and
   a support structure including:
      a support member configured to be mounted to the base member and to be advanced toward the bicycle frame in a first direction; and
      a contact member including a contact part and a coupling part extending from the contact part, the contact part being configured to contact the support member and the bicycle frame, and the coupling part being configured to be movably coupled to the base member.

2. The bicycle front derailleur according to claim 1, wherein
   the base member includes a first receiving part, and
   the coupling part of the contact member is configured to be inserted into the first receiving part.

3. The bicycle front derailleur according to claim 2, wherein
   the base member includes a second receiving part, and
   the support member is configured to be inserted into the second receiving part.

4. The bicycle front derailleur according to claim 3, wherein
   the first receiving part is disposed above the second receiving part in a state where the base member is mounted to the bicycle frame.

5. The bicycle front derailleur according to claim 3, wherein
   the first receiving part and the second receiving part extend in a direction along the first direction.

6. The bicycle front derailleur according to claim 5, wherein
   the first receiving part and the second receiving part extend substantially parallel to each other.

7. The bicycle front derailleur according to claim 2, wherein
   the coupling part includes at least one first protrusion configured to engage the first receiving part of the base member to prevent the coupling part from dropping out of the first receiving part.

8. The bicycle front derailleur according to claim 7, wherein
   the first receiving part is a hole, an end of the hole facing the contact member is formed with at least one second protrusion which is configured to stop a movement of the coupling part within the hole by an engagement with the at least one first protrusion.

9. The bicycle front derailleur according to claim 1, wherein
   the coupling part is coupled to the base member via a fixing bolt which is used for fixing the base member to a mounting bracket of the bicycle frame.

10. The bicycle front derailleur according to claim 9, wherein
    the coupling part has an opening through which the fixing bolt passes.

11. The bicycle front derailleur according to claim 10, wherein
    the opening is an elongated slot configured such that a position of the coupling part is adjustable along the slot.

12. The bicycle front derailleur according to claim 1, wherein
    the coupling part is coupled to the base member via at least one of a low adjustment bolt and a top adjustment bolt which adjusts the retracted position and the extended position of the chain guide respectively.

13. The bicycle front derailleur according to claim 12, wherein
    the coupling part has an opening through which at least one of the low adjustment bolt and the top adjustment bolt passes.

14. The bicycle front derailleur according to claim 13, wherein
    the opening is an elongated slot configured such that a position of the coupling part is adjustable along the slot.

15. The bicycle front derailleur according to claim 14, wherein the coupling part is configured to be removed from at least one of the low adjustment bolt and the top adjustment bolt after the contact part is fitted between the bicycle frame and the support member.

16. The bicycle front derailleur according to claim 1, wherein
the contact part and the coupling part are separate members and attached to each other.

17. The bicycle front derailleur according to claim 16, wherein
the contact part and the coupling part are made of different materials.

18. The bicycle front derailleur according to claim 1, wherein
the contact part and the coupling part are integrally formed as one piece.

19. The bicycle front derailleur according to claim 1, wherein
the contact member is a plate with an "L" shape.

20. The bicycle front derailleur according to claim 1, wherein
the contact member is one of a stamped member and a molded member.

21. The bicycle front derailleur according to claim 1, wherein
the support member is a bolt.

22. The bicycle front derailleur according to claim 1, wherein
the mounting portion includes a threaded portion into which the fixing bolt is to be threaded in a second direction different from the first direction.

23. The bicycle front derailleur according to claim 22, wherein
at least one of an angular position and vertical position of the base member is adjustable with respect to the mounting bracket.

24. A bicycle front derailleur comprising:
a base member configured to be mounted to a bicycle frame, the base member including a first receiving part;
a chain guide;
a linkage assembly configured to movably couple the chain guide to the base member so that the chain guide is movable relative to the base member between a retracted position and an extended position; and
a support structure including:
a support member configured to be mounted to the base member and to be advanced toward the bicycle frame in a first direction; and
a contact member including a contact part and a coupling part extending from the contact part, the contact part being configured to contact the support member and the bicycle frame, and the coupling part being configured to be movably coupled to the base member,
the coupling part being configured to be inserted into the first receiving part of the base member,
the coupling part including at least one first protrusion configured to engage the first receiving part of the base member to prevent the coupling part from dropping out of the first receiving part,
the coupling part being configured to be at least partly elastically deformable so that the at least one first protrusion is displaceable.

25. The bicycle front derailleur according to claim 24, wherein
the coupling part comprises two branches which extend from the at least one first protrusion and which are parallel to each other.

26. The bicycle front derailleur according to claim 25, wherein
the two branches are elastically deformable.

27. A bicycle front derailleur comprising:
a base member configured to be mounted to a bicycle frame;
a chain guide;
a linkage assembly configured to movably couple the chain guide to the base member so that the chain guide is movable relative to the base member between a retracted position and an extended position; and
a support structure including:
a support member configured to be mounted to the base member and to be advanced toward the bicycle frame in a first direction; and
a contact member including a contact part and a coupling part extending from the contact part, the contact part being configured to contact the support member and the bicycle frame, and the coupling part being configured to be movably coupled to the base member,
the contact part and the coupling part are separate members and attached to each other, the contact part and the coupling part being made of different materials, the coupling part being made of flexible material.

28. The bicycle front derailleur according to claim 27, wherein
the coupling part is made from a plastic plate or film.

29. The bicycle front derailleur according to claim 27, wherein
the contact part is made of metallic material.

* * * * *